Figure 5:
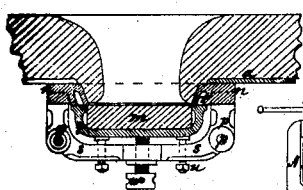

No. 100,003.
H. BESSEMER.
PROCESS OF AND APPARATUS FOR THE MANUFACTURE OF IRON AND STEEL.
PATENTED FEB. 22, 1870.
8 SHEETS—SHEET 1.
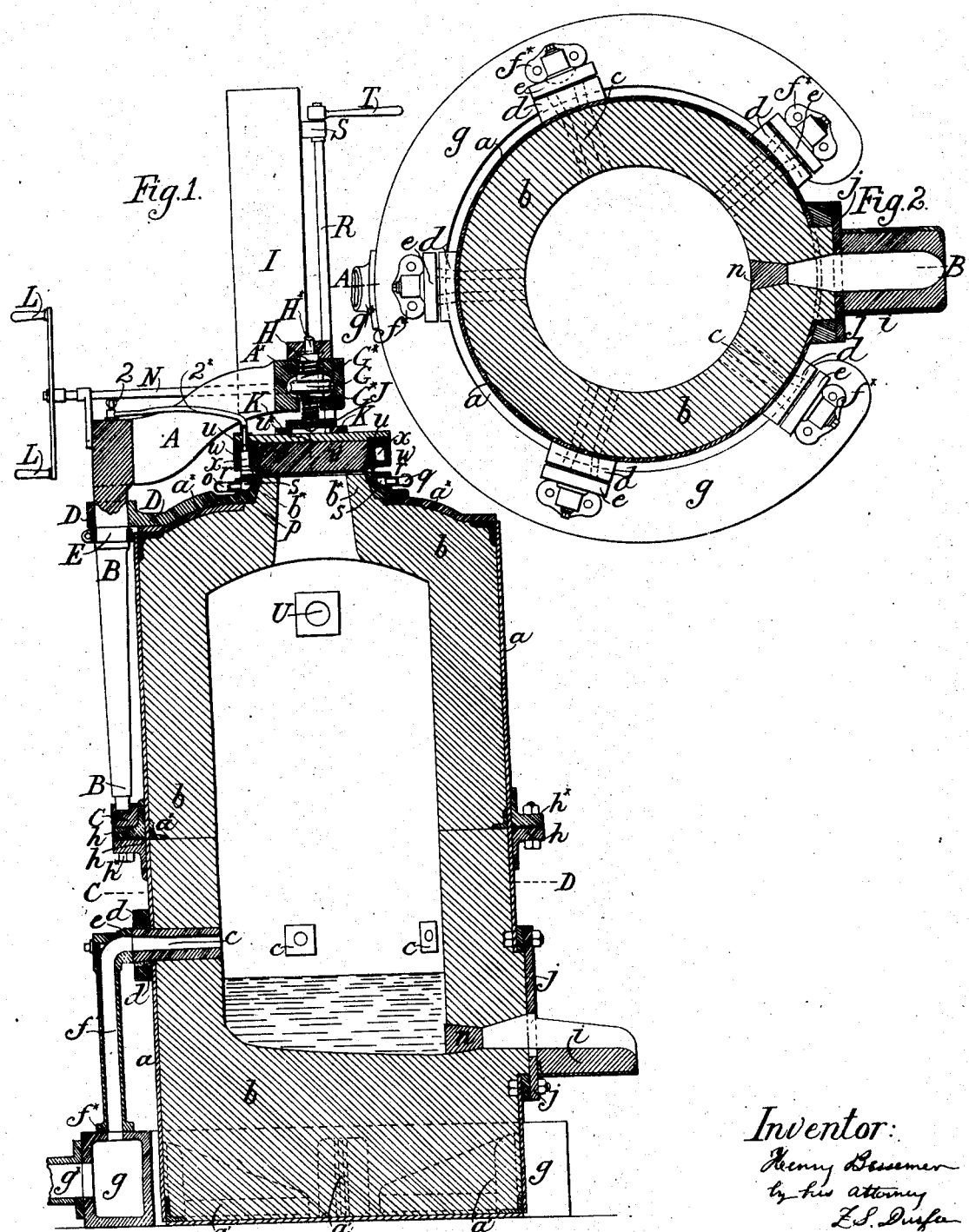
Inventor:
Henry Bessemer
by his attorney
L. S. Dusfur
Witnesses:
John C. Wyman
John L. Swift

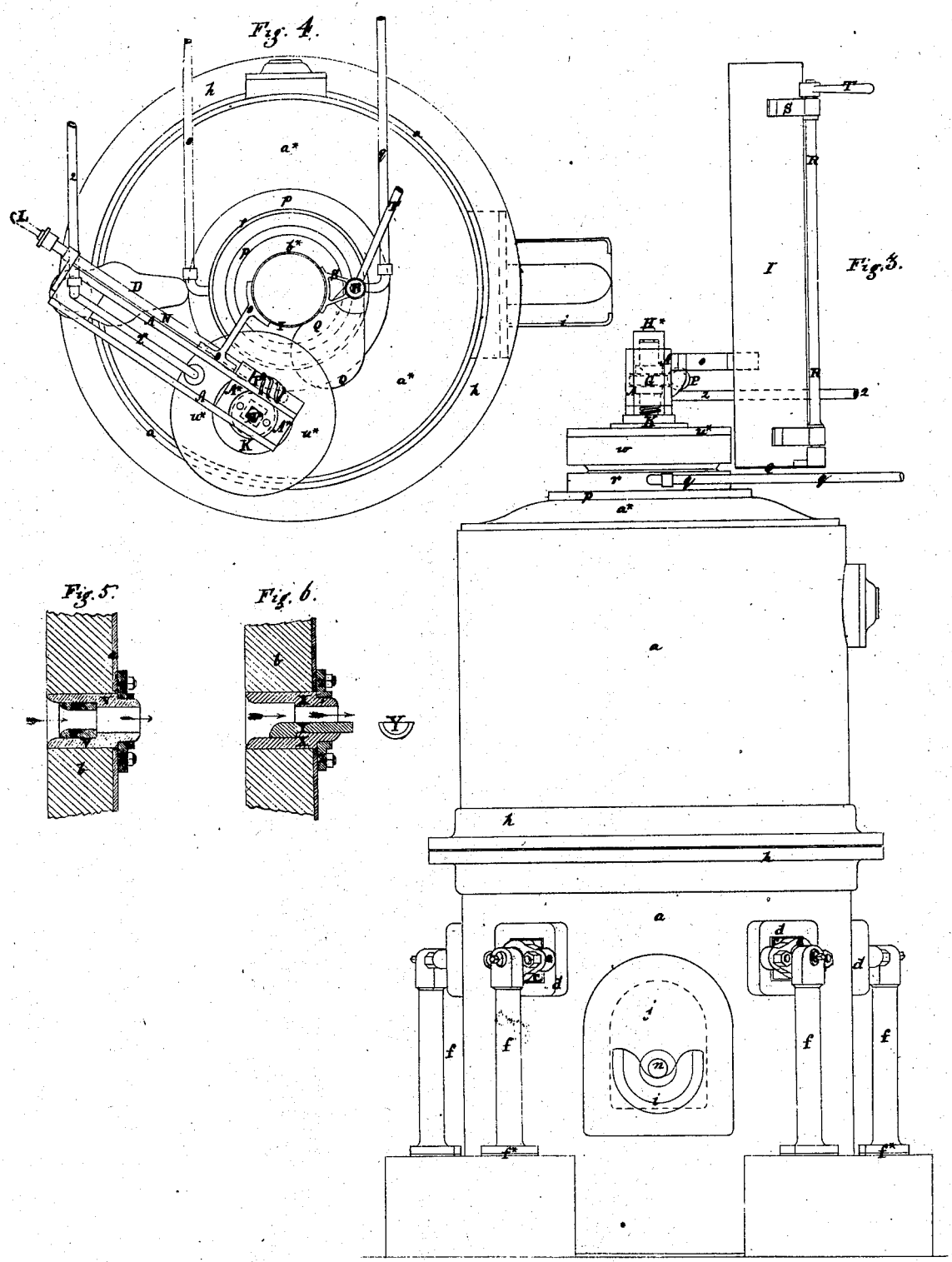

No. 100,003.    PATENTED FEB. 22, 1870.
H. BESSEMER.
PROCESS OF AND APPARATUS FOR THE MANUFACTURE OF IRON AND STEEL.
8 SHEETS—SHEET 3.
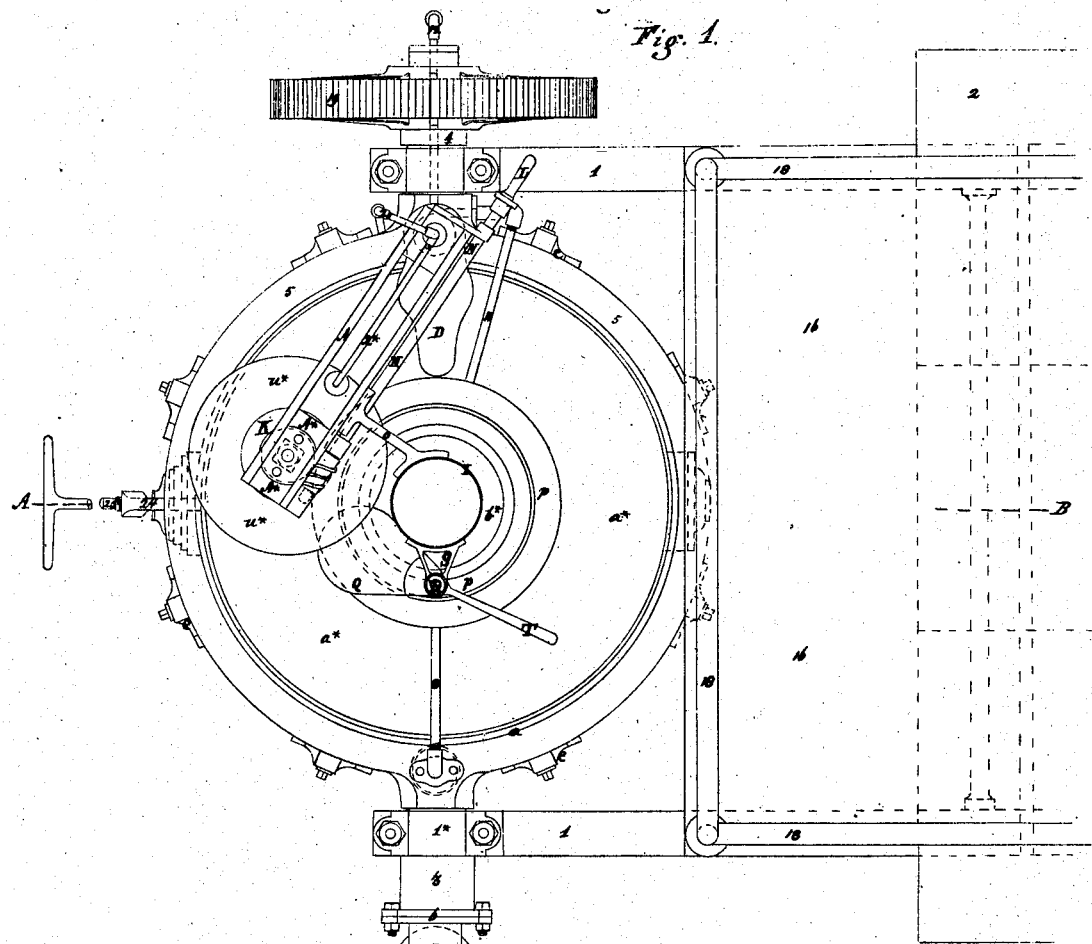

No. 100,003. PATENTED FEB. 22, 1870.
H. BESSEMER.
PROCESS OF AND APPARATUS FOR THE MANUFACTURE OF IRON AND STEEL.

8 SHEETS—SHEET 4.

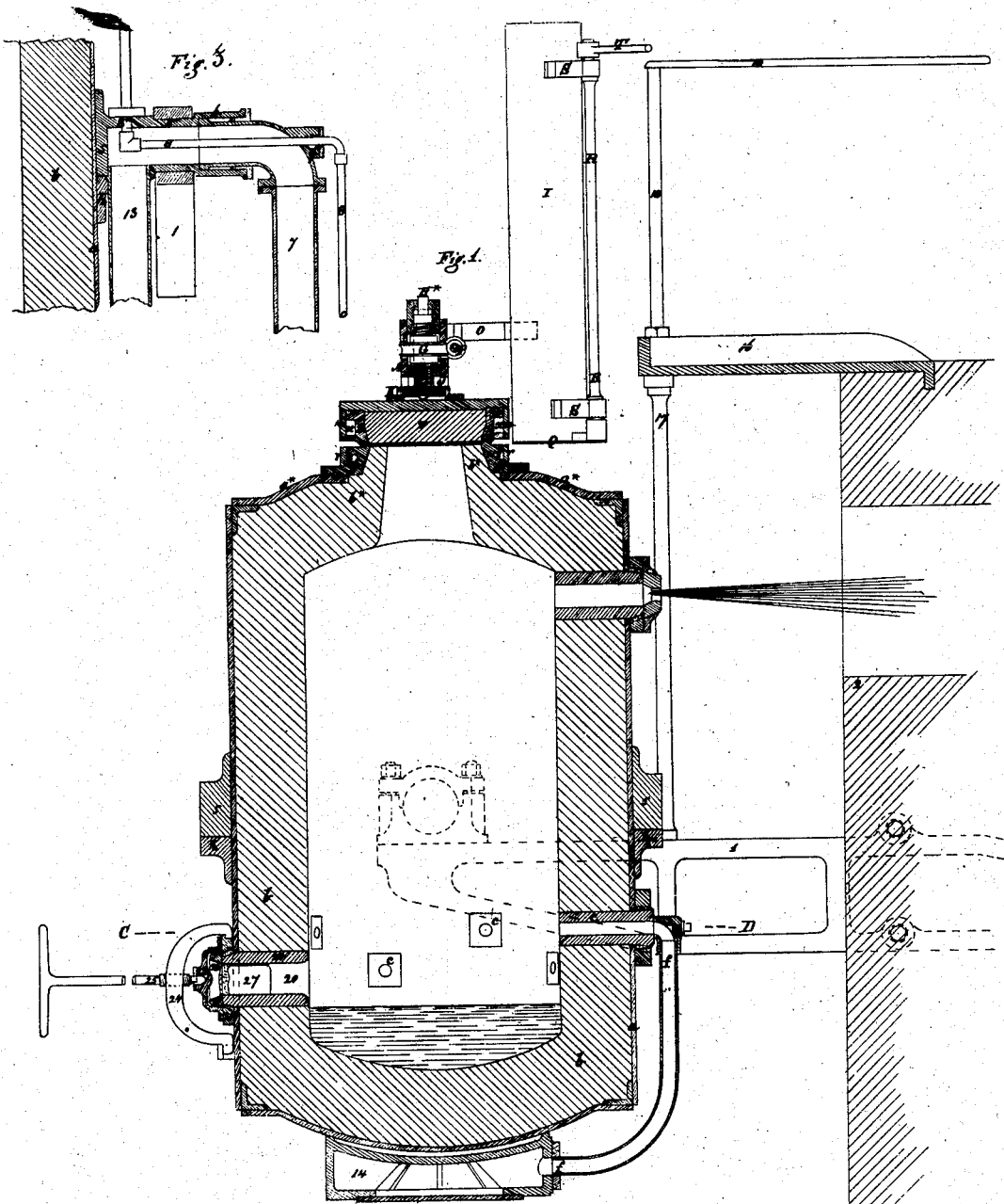

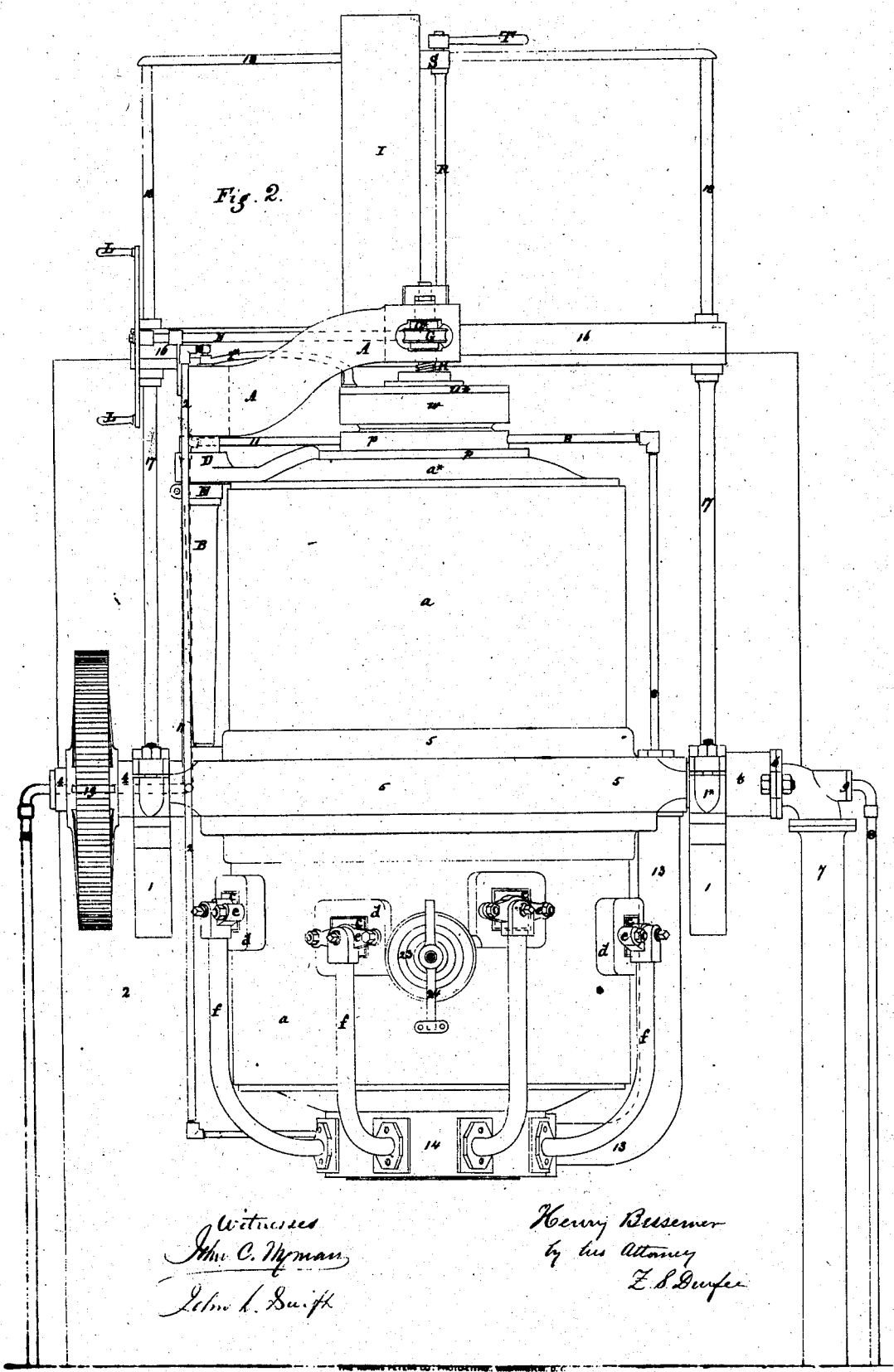

No. 100,003. PATENTED FEB. 22, 1870.
H. BESSEMER.
PROCESS OF AND APPARATUS FOR THE MANUFACTURE OF IRON AND STEEL.
8 SHEETS—SHEET 7.
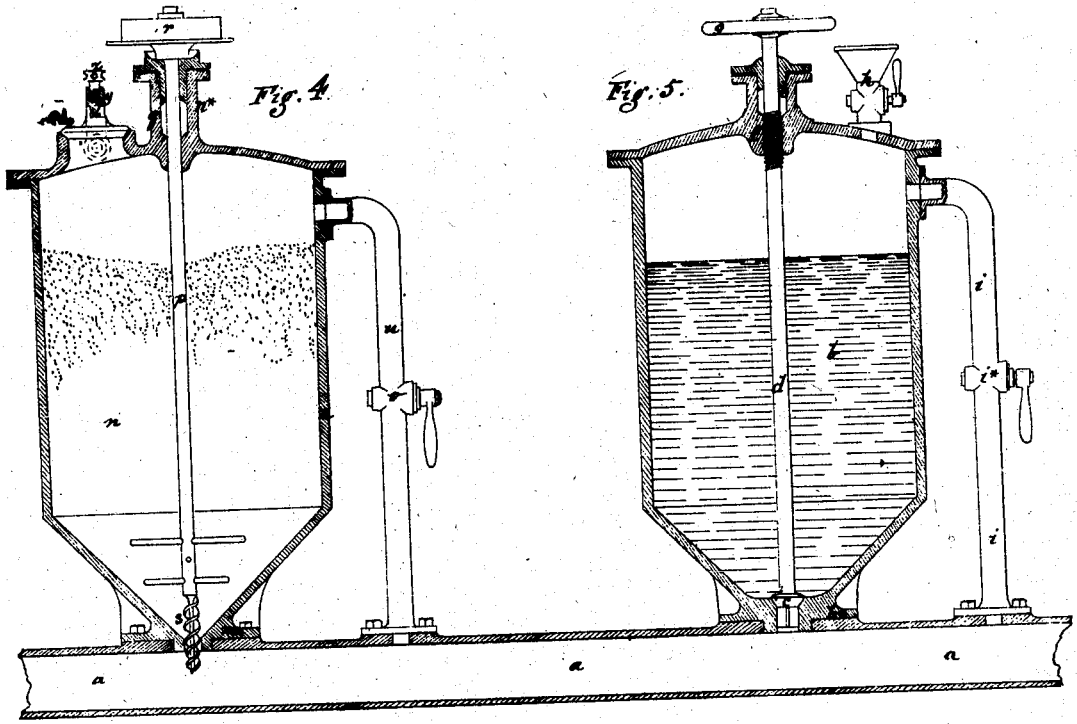
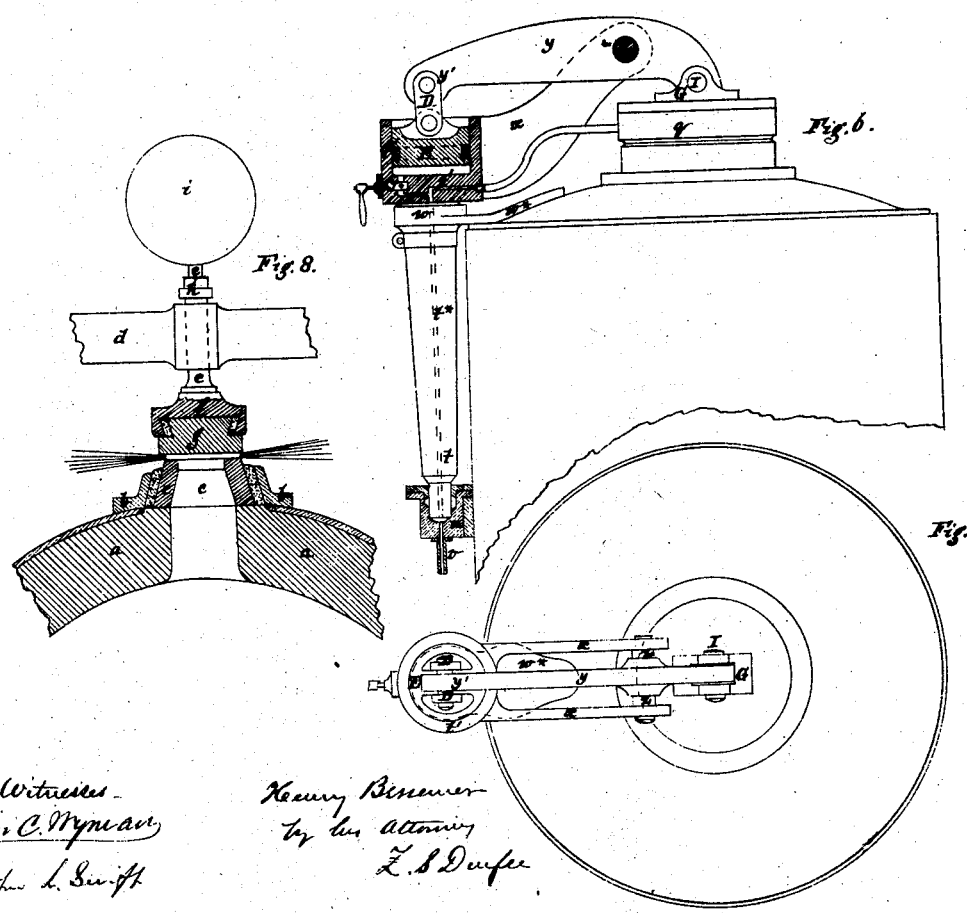

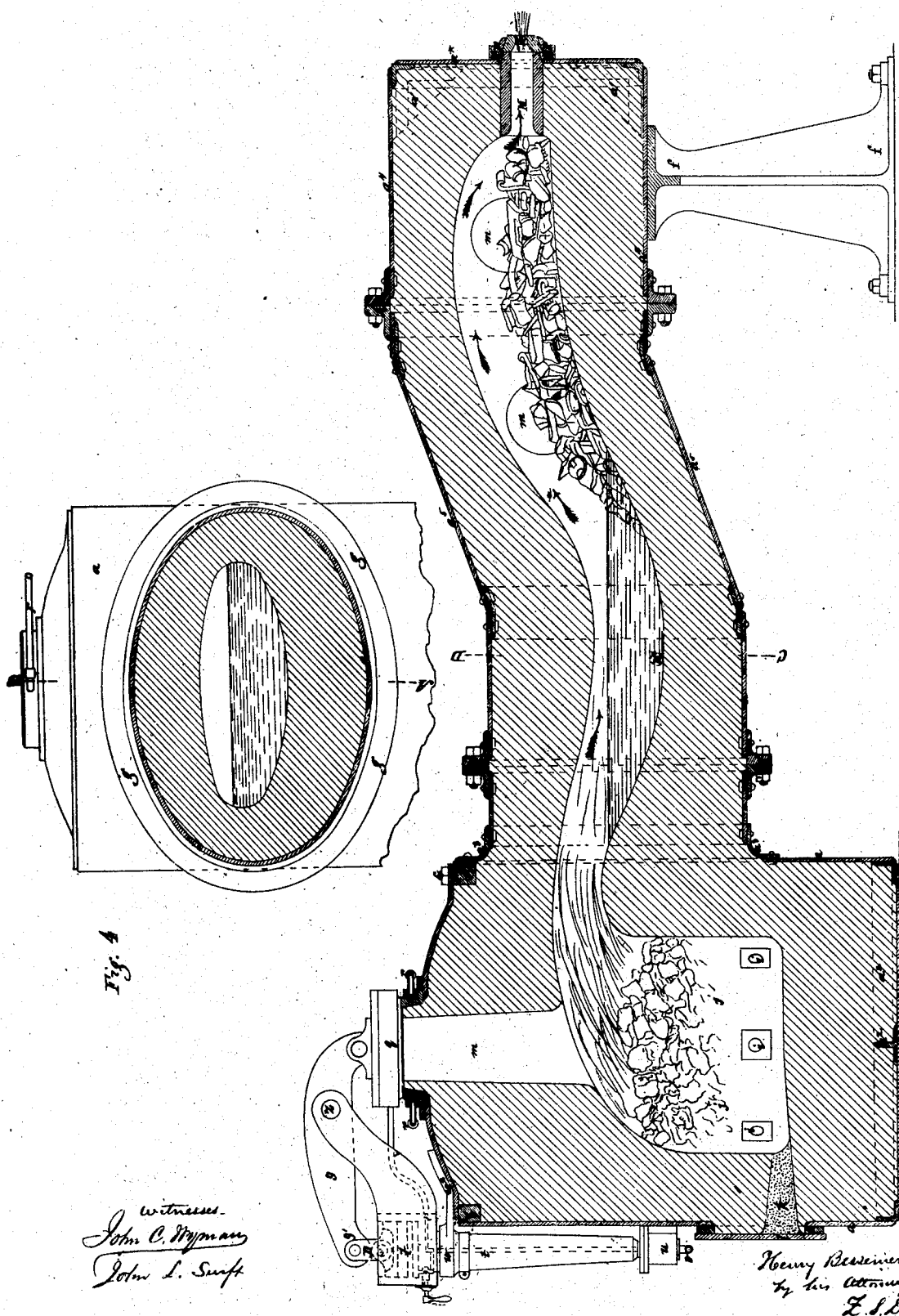

UNITED STATES PATENT OFFICE.

HENRY BESSEMER, OF LONDON, GREAT BRITAIN.

IMPROVEMENT IN PROCESSES AND APPARATUS FOR THE MANUFACTURE OF IRON AND STEEL.

Specification forming part of Letters Patent No. 100,003, dated February 22, 1870.

*To all whom it may concern:*

Be it known that I, HENRY BESSEMER, of Queen Street Place, Cannon Street, in the city of London, a subject of the Queen of Great Britain, have invented or discovered new and useful Improvements in the Manufacture of Cast-Steel and Homogeneous Malleable Iron, and in the fusion or melting of different kinds or qualities of iron and steel and their alloys, and also in the construction and mode of working the furnaces and apparatus employed for such purposes; and I, the said HENRY BESSEMER, do hereby declare the nature of the said invention, and in what manner the same is to be performed, to be particularly described and ascertained in and by the following statement thereof—that is to say:

When cast-steel and homogeneous iron are made by the fusion in crucibles of blistered steel or bar-iron, or when they are made from other qualities or kinds of iron or steel free, or nearly free, from carbon, an extremely high temperature is required for their fusion, and in the ordinary air-furnaces employed for this purpose a very large quantity of expensive fuel is consumed in this melting process.

Now, therefore, one of the chief objects sought to be obtained by means of my present invention is a more rapid and less expensive mode of fusing malleable iron and steel of different kinds, and obtaining cast-steel and homogeneous malleable iron therefrom.

It will be understood that in fusing substances requiring so extremely high a temperature as is necessary to fuse malleable iron, intensity of heat rather than quantity is the condition essential to the successful working of furnaces employed for that purpose. For a substance which requires 3,000° of temperature to produce complete fusion may be kept at a temperature of 2,900° for whole days in succession without becoming thoroughly melted, when the mere addition of only 100° or 200° of heat would, in that particular case, have produced a complete fusion of the substance in a very short period of time. This well-known law of matter operates most disadvantageously in those cases where the fusing-point of the substance to be operated upon closely approaches the limit of heat attainable by the combustion of fuel by a draft or blast of air in ordinary furnaces.

It is well known that atmospheric air and other gaseous fluids in a heated state acquire a still higher degree of temperature by their compression or condensation into a smaller space than they had previously occupied, such increase of temperature being in proportion to their reduced bulk, or to the number of atmospheres forced into the space usually occupied by one. Now, I avail myself of this last-named property of gaseous fluids, and I construct furnaces of sufficient strength to withstand an internal pressure equal to two or more atmospheres, and I retain in such furnaces the products of combustion under such an excess of pressure over that of the external air as will produce the high temperature necessary for rapidly fusing malleable-iron and steel of any kind or quality.

I however desire it to be understood that I do not propose by this means to generate a greater quantity of heat by the combustion or union of a given quantity of carbon and oxygen than is obtained by such means in well-constructed furnaces. For the compression of the gaseous products of combustion within a furnace does not generate heat, but merely concentrates into a smaller space and gives greater intensity to the same quantity or number of units of heat as would have existed in a more diffused state had not pressure been applied; hence wherever the temperature produced by the combustion of fuel in ordinary furnaces having a free escape to the chimney is sufficient for any desired object—as, for instance, the evaporation of water in steam-boilers—a loss would be sustained by compressing the gaseous products of combustion in such furnaces, for the amount of engine-power required to compress the gases would exceed the power obtained from the increased quantity of steam generated in consequence of such compression, all other conditions being equal; but when the highest temperature produced in ordinary furnaces with a free escape is actually less, or when it only, by a small amount, exceeds the temperature absolutely required in any process, the case is entirely altered, and by retaining the heated products of combustion in a highly condensed or compressed state in a close chamber or furnace I am enabled to obtain a much higher degree of temperature within the furnace than would result from the same expenditure of fuel if the said gaseous matters were allowed freely to expand into the larger space they would occupy under ordinary atmospheric pressure.

Thus it will be seen that the temperature produced in such furnaces will chiefly depend on the amount of pressure maintained within the furnace in excess of the pressure of the external atmosphere into which the gaseous products of combustion escape. The temperature, being always in relation to the pressure, is consequently under the complete control of the operator, and he may choose between employing a temperature only a little above the heat necessary to produce a complete fusion of the metal under operation, in which case the rate of fusion will be slow, or he may considerably increase the pressure and obtain a temperature so much in excess of the actual fusing-point of malleable iron or steel as to fuse these substances with great rapidity and impart to the fused metal so high a temperature as to allow ample time for the diffusion of any alloy through it, if required, and at the same time admit of its being poured, without undue haste, into a succession of molds prior to the solidification of any part thereof; but if the heat of the furnace is driven to an excess with a view of economizing fuel, or for the purpose of saving time, it must be borne in mind that the wear and tear of the furnace-lining will be also increased. I therefore prefer a moderately-rapid fusion to working at unnecessarily high temperatures. No precise rule can, however, be rigidly laid down on this point, which must be left to the judgment, skill, and experience of the workman; but, as a guide for him, I may state that in a small furnace, using coke as fuel, with a cold blast of twenty pounds per square inch and a pressure of seventeen and one-half pounds in the furnace over that of the external atmosphere, small test-pieces of cold wrought-iron were fused with great rapidity. For example, a piece of two-inch-square wrought-iron bar, twelve inches long, weighing thirteen pounds, was introduced cold into the furnace, and was completely fused in five and one-half minutes. In the same small furnace three hundred-weight of wrought-iron scrap was put in cold and was poured fluid from the furnace after an interval of fifteen minutes. The furnace was then working with an average internal pressure of fifteen to sixteen pounds per square inch in excess of the pressure of the external atmosphere. I believe that a pressure of twenty to thirty pounds over that of the external amosphere will be found the most economical in practice, for it is probable that if much greater pressure is employed it would raise the temperature so high as to drive the iron rapidly off in the form of vapor and create great loss.

In order to distinguish this new system of fusing malleable iron and steel from other methods that are known and practiced, I have adopted the term "high-pressure furnace" for all the modifications of furnaces working with the gaseous products of combustion blowing off from them under great pressure. Thus "high-pressure cupola-furnace," "high-pressure crucible-furnace," and "high-pressure reverberatory furnace" will indicate, by a common term, the three classes of furnaces hereinafter described.

In carrying my said invention into practical operation I employ several modified forms of furnace, depending partly on the kind or quality of metal to be fused in them, and partly on the kind or quality of the intended product when fused; but, however much the form and details of the furnace are varied, I in all cases prefer to construct the shell or outer case of the furnace of riveted plate iron or steel, after the manner of constructing steam-boilers, and having all the joints well calked and rendered air-tight, and of sufficient strength to resist safely the number of atmospheres or pounds pressure per square inch up to which it is proposed to compress the products of combustion within the furnace, allowance being also made for the additional internal pressure caused by the expansion of the lining of the furnace. In some cases, however, cast-iron may be employed for the outer shell of the furnace, the several parts being securely bolted together and calked at the joints; but when using cast-iron to form the shell of the furnace I prefer to employ strong tie-bolts and hoops of wrought iron or steel, for the purpose of retaining the several parts of the shell together in case of a fracture of any part of the cast-iron by expansion or internal pressure. The several parts may be thus retained in position by the bolts or hoops, so that in case of fracture the disastrous consequences of an explosion will be avoided; so in like manner those furnaces the shells of which are constructed of plate iron or steel may have their fittings made of cast-iron where the shape of the parts renders it desirable. The shell of the furnace may be lined with good Stourbridge fire-bricks, Dynas bricks, or with plumbago or other refractory material; or it may be lined with ground ganister, as practiced in lining the Bessemer converting-vessels now used for making steel.

The extremely high temperature of steel melting furnaces renders desirable the employment of the most refractory materials for the linings of them. When I employ plumbago as a lining for furnaces in which malleable iron and steel or other carburets of iron are fused under pressure, I mix the plumbago with as small a quantity of good fire-clay and water as will render the plumbago sufficiently coherent to admit of its being rammed or kneaded in a moistened state into place and be retained there until it is sufficiently dry to allow the furnace to be fired. The ramming in of the plumbago may be effected in a manner similar to that employed to line the Bessemer-steel converters with moistened ganister, or the plumbago mixed with clay may be formed into molded bricks of the same composition as employed in the manufacture of plumbago crucibles. In either case it will be found more economical to partly line the furnace with ordinary fire-brick, and to form an internal skin or lining only of a few inches in thickness of the more expensive plumbago composition. It is also desirable to use the ordinary fire-brick for the external part of the lining, because it is a much slower conductor of heat than plumbago, and will better protect the outer metal shell from the effects of internal heat.

When the cheapness of the iron or steel produced is of more importance than the extreme purity or high quality of the metal, I prefer to use the cupola form of furnace, consisting of an upright fixed cylindrical or slightly-conical vessel, with or without boshes, and having a dome or covered top, through which the metal to be melted and the fuel used for that purpose are admitted by an iron door faced with fire-brick, but having externally a close metal fitting to prevent the escape of flame and heated gases. The door may be circular in form and be supported on a strong movable iron arm, arranged with a lever and cam, or with a worm-wheel and screw, for the purpose of securing the door firmly in place. The iron arm also carries an upright cylinder of plate-iron having a movable bottom or grid. Into this cylinder the charge of fuel and metal is put, so that on the removal of the door the cylinder is brought over the opening into the furnace. The bottom or grid is then withdrawn and the fuel and metal allowed to fall into the furnace, after which the door is again moved over the opening and secured firmly in place by means of the lever or screw. The blast should be shut off, or nearly so, during the charging of the furnace, after which it may be again turned on, and the operation of the furnace continued as before.

In order to prevent an undue leakage of flame and heated gases from between the feeding-door and the adjacent parts and their consequent rapid destruction by the intense heat of the flame, I make a hollow channel around the door or frame, into which I convey steam or a blast of air, the pressure of which exceeds the pressure within the furnace, so that whatever leakage unavoidably occurs it is simply a leakage of steam or cold air inward, instead of a leakage of flame outward from the furnace. I also cool the parts adjacent to all openings, where necessary, by the circulation of water through suitable channels formed in those parts; and in furnaces requiring a very large feeding-door, in lieu of using the lever or screw arrangement, I secure the door in place by means of air, steam, or water pressure acting on the door by means of a piston with a greater force than is exerted on the door in an opposite direction by the pressure of the gases within the furnace, and thus secure the door firmly on its seat. The removal of the pressure thus applied by opening or reversing a valve allows the door to be removed rapidly. There is also provided an escape-opening (or openings) for the products of combustion, the area of which is capable of alteration and adjustment by means of small cylinders of fire-clay or other pieces of that material inserted in the opening for the purpose of reducing its area.

I prefer to use several tuyeres for conveying the blast among the fuel, and to make them of fire-clay or plumbago, although water-tuyeres may be employed in lieu thereof. The blast may be heated or cold; but I prefer to heat it to a high temperature, and the pressure of the blast may range from two to six pounds per square inch (more or less) over the pressure of the confined gaseous products within the furnace. The pressure of the latter will depend somewhat on the nature of the fuel employed and the more or less refractory character of the metal to be fused, and for these and other reasons it may range from a few pounds to several atmospheres of pressure on each square inch of the interior surface of the furnace. Some of the tuyeres employed direct the blast horizontally or upward, while others direct it downward at about an angle of thirty to forty-five degrees, so as to heat as much as possible the lower part of the furnace and the molten metal collected there.

When the tuyeres which dip downward are intended to heat the metal on the hearth, I place them sufficiently high up to cause the air to traverse a considerable depth of incandescent fuel before reaching the surface of the metal; but if the tuyeres which are directed downward are placed only a short distance above the level of the fluid metal the blast will tend to refine or decarbonize the metal, so that the quantity of carbon taken up from the fuel may, if desired, be thus reduced. The horizontal or upward tuyeres may be used simultaneously with them or they may be shut off during the refining operation.

The tuyeres may also serve, when required, to convey any solid, fluid, or gaseous matters into the furnace that may be found desirable to act on the fuel or on the metal or upon the impurities contained therein—such as lime, carbonate of soda, chloride of calcium, or other flux, as already known or practiced with other furnaces and in other processes of manufacturing iron and steel.

The mode and apparatus by which I prefer to convey any solid substance in the form of powder along with the blast of air into the furnace is shown in vertical section at Figure 4, Sheet C. I introduce such matters into the close vessel $n$ through a valvular opening, $x$, which is closed by a bail, $y$, through which the screw $z$ passes, and by means of which the valve is held down. The lower part of the vessel is conical, and is fitted onto the main blast-pipe by a flange, $m^*$, with which it communicates. A vertical spindle, $p$, passes up the center of the vessel, and also passes out through the stuffing-box $q$, formed in the cover $n^*$ of the vessel. The spindle $p$ carries at its upper end a drum, $r$, by means of which rotary motion may be communicated thereto. The lower end of this spindle is provided with a screw-blade, $s$, which reaches down into the blast-pipe $a$. The pipe $u$ and stop-cock $v$ supply air to the upper part of the vessel $n$, by means of which the pressure above and below the powdered substances is equalized, so that the powder may fall down into the blast-pipe as quickly or slowly as desired, depending on the velocity of the feeding-screw, and be carried forward into the furnace and distributed among the lumps of incandescent fuel. A tapping-hole is also provided, as usual in cupola-furnaces, and a door for cleansing out the slags and for repairing the furnace when necessary.

There is also provided a means of taking the cupola in two parts, for the purpose of facilitating the lining of it with brick-work, or for lining it with moistened powdered materials to be rammed in around a suitable core or mold, as practiced in lining the Bessemer converter. The flanges which unite the two parts I prefer to face in the lathe, so as to admit of their forming a sound joint when bolted together.

The upper portion of the cupola may be lifted off with a crane, and will not require relining so frequently as the lower part, which is acted on by the fused metal and slags.

The tapping-hole I prefer to form by ramming loam around a small truncated cone of well-burned fire-clay, which may be easily driven into the furnace by a blow of the tapping-rod, and thus open the tap-hole rapidly, and of a size dependent on the diameter of the small end of the conical piece of clay. The metal, when melted, is thus drawn off into a ladle, in order to be transferred to molds, as practiced with the casting of ingots or other masses of Bessemer steel.

The addition of spiegeleisen or other alloys of iron, if they be used, may be made to the metal after it has been tapped from the furnace into the casting-ladle; or the metal may be used alone or be mixed with ordinary molten pig-iron in any desired proportion, and be used for casting a variety of articles requiring a foundry-iron of superior strength and hardness; or it may be applied to such other purposes as its peculiar properties may render it suitable for.

And in order that the mode of constructing and working the fixed high-pressure cupola-furnace may be fully understood, I have represented the same on Sheet A of the drawings hereunto annexed, where—

Figure 1:
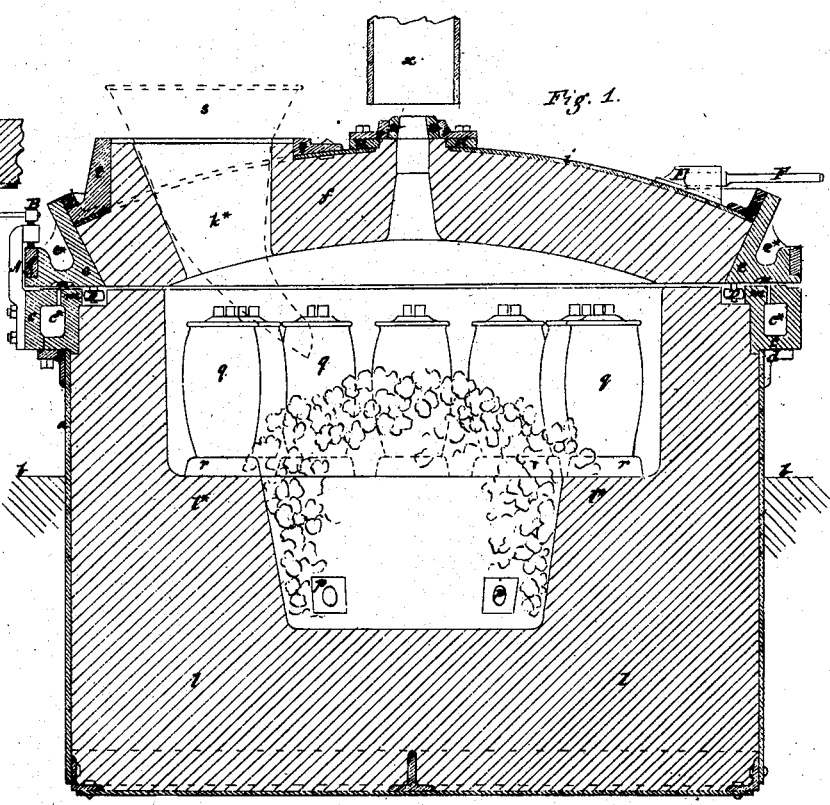
Figure 2:
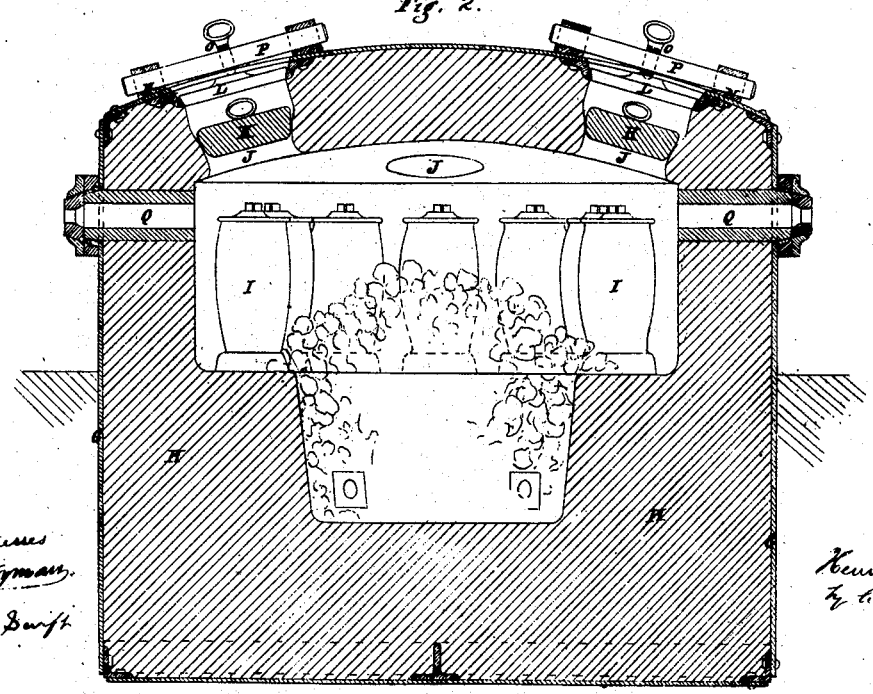

Figure 1 is a vertical section on the line A B of Fig. 2. Fig. 2 is a horizontal section on the line C D of Fig. 1. Fig. 3 is a front elevation of the furnace, and Fig. 4 a plan of the upper part of the same, and Figs. 5 and 6 vertical sections of the escape-aperture.

$a$ is the outer shell of the furnace, formed of strong plates of iron, riveted and calked air-tight at all laps and joints, and having gusset-pieces $a'$, to strengthen the bottom of it.

$b$ is an internal lining of fire-brick, plumbago, ganister, or other refractory material.

$c$ $c$ are fire-clay tuyeres molded square externally, and having a round hole through them for the passage of the blast. They are inserted through the square iron frames $d$, which are secured by countersunk rivets to the shell $a$, and are beveled on the inside. The outer ends of the tuyeres $c$ are enlarged or made taper, and the space between these enlarged parts and the beveled sides of the frames $d$ is calked with iron-cement, (iron borings and sal-ammoniac,) so that the escape of gases from the furnace around the tuyeres is prevented, and the pressure of the flanges $e$ of the blast-pipes $f$ against the enlarged ends of the tuyeres is also prevented from forcing the tuyeres $c$ into the furnace by reason of their enlarged ends and the iron-cement around them, while the blast-pipe flange $e$, by being securely bolted to the iron frames $d$, also prevent the internal pressure acting on the ends of the tuyeres from driving them outward. The blast-pipes $f$ are bolted to the main air-trunk $g$ by flanges $f^*$.

The air-trunk $g$ may, if desired, be placed below the level of the floor, and in that case the pipe $g^*$, conducting air from any suitable blast-engine, will be more conveniently situated. Blast-engines such as are generally employed in the Bessemer process are well adapted for this process.

An equilibrium-valve is placed in the main pipe $g^*$, conveniently near to the furnace, by means of which the blast may be turned on or off, or moderated from time to time, as desired.

The feeding-door of these furnaces is so small that it is necessary to provide a special means of entering the furnace for relining the interior from time to time. For the purpose of giving convenient access to all parts of the interior I divide the furnace into two parts by massive angle-flanges $h$ $h$, which are faced so as to form an air-tight joint, and are secured together by bolts and nuts, as shown at $h^*$. When the furnace is to be repaired the upper part may be lifted off with a crane when the lower part will be readily accessible. A small flange, $a'$, prevents the brick-work of the upper part from being displaced when lifted off.

The furnace is provided with a spout, $i$, lined with loam, for conducting the metal into the casting-ladle. A door, $j$, is formed at this part, having only a small opening in it. By unbolting this door and removing part of the lining, the furnace may be cleaned out, the lining being afterward made up, as in ordinary cupola-furnaces; but I prefer in making up the tap-hole to insert a conical piece of well-burned fire-brick, as shown at $n$, so that when the metal is to be drawn off from the furnace the workman, instead of having to drive a hole through the solid material with a pointed bar, will simply drive the cone $n$ into the furnace, and bracket, O, to the crane-arm. The lower part of the cylinder I has a plate, Q, fitted to it. The plate Q is keyed onto an upright spindle, R, supported by bearings S, attached to the side of the cylinder, the upper end of the spindle having a handle, T, by means of which the plate Q is made to close or open the bottom end of the cylinder.

While the furnace is under blast the workmen will put a charge of coke or other fuel into the cylinder, and along with it the scrap or other malleable metal to be fused, and when the cylinder is filled the blast may be turned off, the handles L put in motion, and the door u lifted sufficiently to allow the crane-arm to be moved round until the feeding-cylinder I is brought vertically over the mouth of the furnace. A slight movement of the handle T will remove the plate Q from beneath the cylinder and allow all the fuel and metal to fall at once into the furnace. The crane-arm is then quickly moved back into its former position and the door is again forced down by turning the handles, an operation in practice occupying from thirty to forty seconds of time. Immediately after the closing of the furnace the blast is turned on and the operations of the furnace resumed, and at such intervals as are found necessary the same operation may be repeated. In the plan, Fig. 4, the crane-arm is shown in the position it occupies during the time that the fuel is being discharged into the furnace. The plate Q is also shown removed from under it. I prefer to take the supply of air to the door u from the main blast-pipe at a point where the equilibrium-valve does not shut off the supply. The air will thus continue to flow during the time the fuel is being supplied to the furnace, and in the act of moving the door again over its seat the numerous jets of air from the small drilled passages before named will blow away with considerable force any small particles of fuel or other matter from the surface against which the door fits.

In order to admit of the motion of the crane-arm and to continue the connection with the air-supply, the pipe 2 is taken to the top of the crane-post and is there jointed to the pipe 2*. This piece of pipe 2* is made of thin copper or pewter, and will spring sufficiently to allow of the slight rise and fall of the furnace-door.

One of the chief peculiarities of this mode of working furnaces under a high pressure of the gaseous products within them is the outlet for the escape of flame so different to the ordinary cupola-furnace, where the outlet is generally equal to the full diameter of the furnace; but when working under pressure in one of these high-pressure furnaces I have found that an opening of two and one-fourth inches in diameter is sufficient for a furnace whose transverse area is five hundred and seventy-two square inches, the outlet being about one hundred and forty-fourth part of the sectional area of the furnace. Thus it has been found that with an internal pressure of sixteen to eighteen pounds per square inch in excess of the atmospheric pressure one square inch area of outlet may be reckoned approximately as the area required for every two hundred-weight of coke burned per hour in such furnaces.

On Sheet A, I have shown the outlet of the furnace at U. In the simplest form it consists of a square block of fire-brick having a round hole in it of the desired size. It is made with a shoulder externally, which abuts against the interior of the casing a, to prevent its being forced out by internal pressure. A slight difference in the area of the outlet materially effects the condition of the furnace. It is hence desirable to have some means of altering it. In Fig. 5 I have shown a vertical section of an outlet-block, V, having two internal diameters, forming a shoulder. Into this a small fire-clay cylinder, W, is put for the purpose of contracting the area of outlet, and at Fig. 6 a similar outlet-block is shown at X, having a small piece of molded fire-brick, Y, inserted therein, and projecting sufficiently to be lifted out by a pair of tongs and be replaced by other pieces of different size. In both figures I have shown a flange-plate, Z, by which the outlet-blocks are retained in place. By unscrewing this flange-plate the outlet-block, when too much worn, can be readily replaced by a new one.

I would remark that the amount of pressure up to which the gaseous products are kept within the furnace will depend chiefly on the regulation of the pressure of the blast, the escape-aperture being also regulated so as to prevent the pressure going below or getting above the point desired. In some cases the escape of the flame and heated matters may be regulated, as hereinafter more fully described, by a loaded valve, the face of which is formed of well-burned fire-clay or other refractory matters, in which case a stop may be provided, so as to prevent the valve from entirely closing; but I prefer that the escape should take place through one or more plain apertures, as above described, as it may be thus more easily directed in a manner so as effectually to utilize the heat of the escaping flame, which may be directed onto or into a bath containing the spiegeleisen to be used at the end of the process; or the heat may be employed to bring up the temperature of the metal and fuel previous to its being introduced into the furnace. It may also be used for heating the blast or to generate the steam required to work the blast-engine by causing the heated products to pass under or through the tubes of an ordinary steam-boiler.

Although I have described a fixed or stationary cupola-furnace, I nevertheless prefer, in most cases, to employ another modification of the apparatus in which the cupola is suspended on trunnions, and is capable of being tipped or moved thereon in a manner similar to the motion of the ordinary Bessemer converting-vessel, and whereby the metal may be poured out of the furnace from an opening situated thus open a passage at once equal to the size of piece attached. A small cross-bar and screw (not shown in the drawings) may be employed to prevent the accidental blowing out of the cone, the bar extending across the door $j$, and the screw pressing against the small end of the cone $n$.

It will be readily understood that in furnaces working under great internal pressure a special arrangement is necessary to secure the feeding-door against a leakage of the highly-heated products of combustion, and against a force, it may be, of several tons, tending to force it open, the arrangement also being such as to admit of the easy and rapid opening and closing of the door for the admission of fuel and metal. One of the modes which I employ for this purpose is shown applied to the upper part of the furnace delineated on Sheet A.

On the upper or crown plate or dome, $a^*$, of the furnace I rivet a stout ring of iron, $p$, around which a hoop, $r$, is tightly shrunk. On leaving a space or annular channel, $s$, in which water circulates for the purpose of keeping it cool, the water is supplied by the pipe $o$, and after circulating around the ring $p$ it escapes by the pipe $q$. The ring $p$ is also further protected by the lining of the furnace, as shown at $b^*$.

The fire-door frame $u$ and its covering-plate $u^*$ is made, by preference, of wrought-iron, the frame having a conical interior, in order the better to support the fire-lump $v$. The frame $u$ has a channel, $x$, formed around its exterior surface, over which a hoop of iron, $w$, is shrunk, so as to complete the annular passage $x$. The lower surface of the frame $u$ rests on the upper edge of the ring $p$, both these faces being surfaced and made true. The under side of the frame $u$ has a small V-shaped groove or channel turned into it, and at about an inch apart all round this groove small holes are drilled, which pass upward at an angle and connect the V-shaped grooved channel with the annular space $x$. A pipe, $2^*$, conducts air from the main blast-pipe into the channel $x$, which passes thence down the numerous small drilled channels, and thus supplies air under pressure to the V-shaped groove before named. Now, the pressure of the blast exceeds the pressure of the gases within the furnace. Consequently any imperfection in the fitting of the door-frame $u$ down upon the upper ring, $p$, of the furnace, instead of allowing the highly-heated gases to escape and act destructively on the metal fittings, such gases are prevented from escaping, because in case of imperfect fitting of the metallic surfaces the air under pressure in the V-shaped groove will, by reason of its superior pressure, force its way between the imperfect joint, partly escaping into the upper part of the furnace and partly into the external atmosphere, thus keeping the surface cool and the metal-work from injury. By this means it is found that so much only of the fire-lump $v$ as is exposed to the direct radiant heat of the fire becomes red-hot, this part of the lump $v$ which forms the upper side of the narrow annular space left between it and the top of the furnace-lining not reaching a red heat in consequence of the slow leakage of cold air inward. It will be understood that steam in lieu of air may be applied to this purpose, if desired, provided its pressure exceeds that of the gaseous products within the furnace.

In order to remove the door $u$ from the mouth of the furnace and readily replace it, as required, I employ a sort of crane-arm, which consists of two stout plate-iron cheeks, A A, bolted to the crane-post B. This latter is supported at its lower end in a socket, C, bolted to the angle-flange $h$. The upper end of the crane-post is supported by a strong bracket, D, having a hole through it, in which the crane-post turns. At E is a movable collar fitting into a journal formed on the crane-post, for the purpose of preventing the crane-post from being lifted upward when pressure is applied to the furnace-door. Between the cheeks A a piece of iron, $A^*$, is firmly bolted, having a slot in the center, in which a worm-wheel, G, is fitted.

The wheel and its elongated bosses $G^*$ form, also, a screw-nut, through which the screw H works, a square part, $H^*$, being formed on the upper end of the screw to prevent its turning round, but not preventing its free motion upward or downward through the block of iron $A^*$, the holes in which are of a diameter equal to the largest diameter of the screw, and have no internal threads formed in them, the holes merely acting as guides for the screw H, which carries on its lower end a plate, J, fitting loosely inside a flanged ring, K, which is secured by bolts to the upper plate of the furnace-door. The object of the ring K and loosely-fitting plate J is to cause the door, when lifted, to be suspended in a horizontal position. The freedom thus given to the door is for the purpose of allowing it always to find its proper bearing on the ring $p$. The end of the screw H then coming in contact with the upper plate, $u^*$, of the door will bind it firmly on its seat. For this purpose the handles L are mounted on the shaft N, which also carries the worm P. This worm gears into the worm-wheel G, by the rotation of which the screw H is made to rise and fall without rotation, carrying with it the door $u$. By the compound screw motion thus arranged a very small exertion of force on the handles will enable the door to be raised or lowered and retained in position against the internal pressure of the gaseous products of the furnace. The movement upward of the door need not exceed one-quarter of an inch to allow of its being moved on the crane from over the opening of the furnace. Two stops (not shown in the drawings) may be used to prevent the crane-arm from being moved too far in either direction.

For the purpose of facilitating the introduction of fuel and metal into the furnace I employ a vertical feeding-cylinder, I, made of thin plate-iron, which I secure by a strong iron above the level of the metal, and thus much of the trouble and inconvenience of tapping the metal from the lowest part of the furnace is avoided, while it also affords a convenient means of pouring out a sample of metal from time to time and running out any accumulated slags. When the movable form of cupola is employed the blast may be carried through the hollow axis or trunnions, or it may be conveyed through an arrangement of jointed pipes. So in like manner steam or water used for cooling any part of the furnace may be conveyed to it.

In order that the mode in which I construct high-pressure cupola-furnaces movable on axes may be fully understood, I have represented the same on Sheets B and C of the annexed drawings, where—

Fig. 1, Sheet B, is a vertical section on the line A B of Fig. 1, Sheet C; and Fig. 2, Sheet B, is a front elevation of the furnace. Fig. 3, Sheet B, is a vertical section, showing the mode of admitting air and water through the trunnion or axis. Fig. 1, Sheet C, is a plan, and Fig. 2, Sheet C, is a horizontal section of the same furnace on the line C D of Fig. 1, Sheet B.

In this modification of the cupola-furnace the mode of constructing the outer shell of riveted plates, its lining of fire-brick, plumbago, or ganister, and the modes of making and fixing the tuyeres are all identical with those already described in reference to the fixed cupola-furnace shown on Sheet A of the annexed drawings, as hereinbefore described. So, also, it will be seen that the whole of the crown or upper part of the movable cupola-furnace, and the crane-arm and crane-post, furnace-door, worm-and-screw arrangement, and the feeding-cylinder are precisely like those before shown and described, and will therefore be understood without again repeating a description of them. I have, however, indicated the several parts of the apparatus which have been before described by the same letters of reference as were used to denote them on Sheet A, so that no mistake may be made as to the nature or purpose of any such parts; and in describing the several parts of the movable furnace which are peculiar to it and not before described, I have used figures instead of letters of reference to denote such parts.

The cupola, movable on axes, may be supported on strong standards resting on the ground at each side; but as such standards would be more or less in the way, I prefer to support the cupola on the cantilevers 1, which project from a solid wall, 2, forming part of a chimney or furnace, into which the gaseous matters are projected with considerable velocity. The trunnions 3 and 4 project from a strong iron flanged band or trunnion-ring, 5, extending around the cupola, and to which the lower angle-flange, $h$, is bolted, and thus the two parts of the cupola are suspended. The trunnion 3 extends beyond the plumber-block 1*, which is formed on the end of the cantilever 1, and is provided with a stuffing-box and gland, 6, through which the blast-pipe 7 enters. This is best seen in section at Fig. 3, Sheet B. A small pipe, 8, passes through a stuffing-box formed at 9 on the elbow of the blast-pipe. The pipe 8 then passes upward through the trunnion at 8*, and is for the supply of water to the ring $p$, which forms the mouth of the furnace. The pipe 8, after passing some distance beneath the floor, rises up and is connected with an elevated reservoir, for the supply of water to the ring $p$. After circulating through the ring $p$ the water descends by the pipe 11 through the axis 4, and by means of the pipe 12 is conveyed away. The blast of air, after passing through the trunnion 3, descends by means of the pipe 13 into a cast-iron box, 14, secured to the lower plates of the cupola. From this box the pipes $ff$ convey the blast into the tuyeres before described in reference to the fixed cupola upon the upper part of the brick-work. A stage is formed by the iron plate 16, which is supported by upright standards 17, which rest on the cantilevers 1. The stage thus formed is surrounded by a railing, 18, and on it the workman is stationed who supplies fuel and metal to the furnace. A similar feeding-stage may be employed for the supply of fuel and metal to the fixed cupola hereinbefore described, but which is not shown in the drawings. A stage or standing-place should also be provided in both cases for the use of the workman who operates the crane-arm and opens and shuts the furnace-door when required.

The motion of the vessel on its axis may be effected by ordinary spur-gearing in connection with a revolving shaft slowly turned by engine-power and capable of being thrown in and out of gear or reversed by the ordinary means used for such purposes; or the cupola may be moved by means of hydrostatic pressure, as usually applied for giving motion to Bessemer converting-vessels. I have shown a spur-wheel, 19, on the axis 4 of the cupola for this purpose, but have omitted in the drawings the hydrostatic apparatus, which is now well known and understood.

In cupola-furnaces movable on axes the ordinary tapping-hole is replaced by an opening of much larger size, made in a piece of fire-brick, and shown at 20. This piece is fitted into a ring, 21, leaving a conical space between the fire-clay and ring 21. This space is calked with iron-borings, and not only serves to prevent the escape of gaseous matters from the furnace, but, a conical part being formed on the fire-clay piece, the latter is prevented from being forced out of the furnace by internal pressure. The ring 21 is secured to the shell of the furnace by countersunk rivets, and the front face of it is fitted to an iron cover, 23, by means of which the opening is closed. An arch-shaped piece of iron, 24, falls into two notches made to receive its outer ends, and a screw, 25, passes through a central boss in the arched piece. By means of this screw and its cross-handle the cover 23 is firmly held in place. The end of the screw is formed into a loose cone, fitting so as to give some play and allow the cover to fit freely in place. A false ring or lip of fire-clay, 26, is fitted in so as to cause the stream of metal to flow clear of the iron surfaces when the cupola is tipped up. For the discharge of the metal a rough lump of burned fire-clay, 27, is put into the opening, to intercept the radiant heat on its passage to the cover. A little loose sand may also be used; but I have not found it necessary.

I have before stated that some of the tuyeres may be made to dip, so as to direct the blast downward at an angle onto the metal. An example of this form of tuyere is given at Fig. 3, Sheet C, which shows a section through the side of the cupola and tuyere, the several parts being indicated by the same letters of reference as are used to denote similar parts on Sheet A. And here I would remark that the same general mode of working may be followed in fusing malleable iron and steel, or other carburets of iron, in movable cupolas, as described in reference to the fixed one, except that instead of tapping all the metal at once the movable cupola admits of taking out tests or samples of metal from time to time, if desired, and also of running off the slags as they accumulate.

In order to facilitate the fusion into a liquid cinder all the impurities of the fuel and the materials derived from the furnace-lining, lime or other fluxes heretofore employed for such purposes may be used in my improved furnaces in such quantities as the nature of the fuel and other circumstances may render necessary, such fluxing materials being introduced with the charges of fuel, or conveyed into the furnace by means of the blast, in the manner hereinafter described.

The usual door for cleaning out cupola-furnaces after use, although not shown in the drawings on Sheets B and C, may be used, as desired; but it will be found that by keeping the slags fluid by a sufficient quantity of alkaline or other fluxes this opening may be dispensed with. I would also observe that when malleable iron or steel is fused in cupola-furnaces there is a tendency to take up more carbon than is desirable in some cases, notwithstanding that the metal is coated with a vitreous flux, as before described. It will therefore be preferable to also protect the surface of the molten metal as it accumulates by allowing a little fluid cinder always to remain floating upon it, and, for the same reason, to employ as small a quantity of fuel as is found sufficient to generate the necessary heat. For these reasons I prefer to employ the cupola-furnace in those cases where a slight degree of carburation of the metal is not injurious, and to use the reverberatory furnace for the fusion of malleable iron and the milder qualities of steel.

The fuel I prefer to use is a good hard coke, or anthracite coal as pure and free from sulphur as can be readily obtained. Charcoal or other fuel may, however, be employed, and also lime or other fluxes hitherto known or employed for keeping the slags or cinder in a fluid state; and although I prefer to employ solid fuel, it will nevertheless be obvious that in cases where combustible gases and air are employed, as in the furnace known as "Siemens regenerative gas-furnace," or other gas-furnaces, or where liquid hydrocarbons are to be employed in the fusion of malleable iron or steel, or melting of iron of any kind, this same system of increasing the temperature by confining the flame and heated products of combustion under pressure within the furnace may be employed, the gaseous and liquid fuels and air being forced, by suitable force-pumps, into the chamber or furnace where combustion takes place, and where they are retained under the desired pressure by means similar to those hereinbefore described.

In carrying into practice that part of my invention which relates to the combustion of gases under pressure in what may be called a "high-pressure gas-furnace" I proceed as follows: The gases to be employed may be generated by the slow combustion of coal fuel on an inclined grate or in close retorts, as generally practiced in making coal-gas for illuminating purposes, to neither of which modes of producing gas do I lay any claim. The gas thus or otherwise made may be received in suitable gasometers. I employ a combined gas and air forcing apparatus, in order to force both the air and gas into separate receivers under the desired amount of pressure. For this purpose I prefer to use a blast-engine constructed after the manner of the blast-engines in general use in the Bessemer-steel process. When using this kind of blast-engine I disconnect the pipes of one of the air-cylinders from the air-vessel, and I connect the exhaust-pipe of such cylinder with the gasometer before named, and the delivery-pipes of such cylinder I connect with a gas-receiver in which the gas is to be compressed to the desired extent. The other air-cylinder of the blast-engine may be, as at present, connected to an air-receiver, so that by the simple alteration of these pipes and the addition of a gas-receiver the blast-engine becomes applicable to the condensation both of gas and air in separate reservoirs under any desired amount of pressure.

The furnace which I prefer to employ for the fusion of malleable iron and steel by the combustion of gases under pressure is of the reverberatory kind, and may be constructed after the manner of the several kinds of gas-furnaces known and in use, except that in all cases the entire mass of brick-work or other refractory substances of which the furnace is constructed must be inclosed in a strong iron casing riveted and calked air-tight, and sufficiently strong to withstand the internal pressure to be used therein. An example of this mode of casing a reverberatory furnace is given at Figs. 3 and 4 on Sheet D of the annexed drawings, which is, however, arranged for the combustion of solid fuel. In constructing similar furnaces for the combustion of gases under pressure the fire-chamber will not be needed, and will be replaced by the air and gas flues, or by the compound or other jet-pipes that are used to convey or mix and distribute the gas and air into such furnaces. The door for the admission of the metal to be fused, and the exit-aperture for the escape of flame and other gaseous products of combustion, may be made in the manner hereinbefore described in reference to the feeding-door and exit-openings of the fixed cupola-furnace, or such modifications thereof and alteration of position as the nature and arrangement of the several kinds of gas-furnaces known or in use may require.

The quantity of air and gas admitted to the furnace from time to time will be under the control of the workman. For this purpose a slide-valve or equilibrium-valve is fitted both to the gas and air main pipes, and by means of them the supply of gas and air may be turned on or off, or be regulated as required. The gas and air may be used at their natural temperature, or one or both may be heated in pipes preferably made of malleable iron or steel; or the gases may be heated under the system known as "Siemens regenerative furnace," in which case the regenerators and all passages or flues employed for the passage of the air and gases must be contained in a close case or jacket of riveted iron or steel, or made of cast-iron and well bolted together and calked and rendered air-tight.

When employing liquid hydrocarbons for the fusion of malleable iron or steel in furnace in which the gaseous products of combustion are retained under pressure, I prefer to use the reverberatory form of furnace, which may be constructed in the manner represented at Figs. 3 and 4 on Sheet D of the drawings hereunto annexed, and hereinafter described. In this case I employ also solid fuel—such as coke—and I cause the fluid hydrocarbon to be taken in by the blast and be distributed among the pieces of incandescent coke, and thus produce a large amount of flame.

The mode of introducing the fluid fuel into the blast-pipe is shown in vertical section at Fig. 5, Sheet C, of the annexed drawings, where $a$ is the main blast-pipe leading to the tuyeres. The vessel $b$ is bolted by a flange, $b^\times$, to this pipe, the lower part of the vessel terminating in a cone-valve, $c$, the spindle $d$ of which is carried upward through a suitable stuffing-box, $e$, formed in the cover of the vessel. In the boss of this cover, at $f$, a screw-thread is formed, and the screw is also formed on the spindle $d$, so that the rotation of the spindle, by means of the hand-wheel $g$, will raise or lower the valve and regulate the velocity of flow of liquid fuel into the blast-pipe, along which the powerful blast will carry it as a spray into and through the tuyeres. The vessel $b$ is provided with a funnel and cock, $h$, for the supply of liquid fuel, and also with an air-pipe, $i$, and cock $i^\times$, for the purpose of supplying air under pressure to the upper surface of the fluid, and thus admit it to flow by gravity into the blast-pipe. In some cases it may be found preferable to supply the fluid in jets at the tuyeres, the jet being in the center of the tuyere, in which case the employment of solid fuel may be dispensed with, as is now well understood. I however prefer to employ it in conjunction with solid fuel for the purposes of my invention.

In order to protect the metal from an undue amount of oxidation or carburation during its passage downward among the fuel and blast, I prefer to coat the metal with a substance or compound capable of fusing at a moderate heat, and of forming a vitreous or glassy covering to the metal. For this purpose a mixture of clay, lime, and sand may be employed, either with or without an admixture of red ore or alkaline salts, these matters being mixed with water to about the consistency of cream. The pieces of metal are to be dipped into or sprinkled over with this semi-fluid matter and then dried before they are charged into the furnace. The bath of metal in the reverberatory furnace may also be protected by a covering of fluid slag or cinder, by adding a small quantity of the before-named materials to the bath during the fusion of the metal; or, in lieu of this, bottle-glass (where it can be cheaply obtained) may be used. The degree of carburation of the molten metal may also be to some extent regulated by the angle of the tuyeres and their height above the metal, as before described.

The several qualities or kinds of materials to be fused in my improved furnaces or apparatus and be there converted into fluid steel, or into fluid malleable iron, or into alloys of iron, or mixtures of different kinds of iron and steel, may consist of puddled iron or puddled steel in a more or less granular or concrete state, or as puddled balls, if sufficiently purified from phosphorus; or the puddled metal, either in the condition of iron or steel, may be shingled and made into blooms or puddled bars, and be cut into small or convenient pieces; but for the manufacture of the better kinds of homogeneous malleable iron or cast-steel I however prefer to use finished iron or puddled steel bars, or bars of blistered or cemented steel, also cut into convenient lengths, which, by preference, may be fused in crucibles in the improved furnace hereinafter described, although they may be fused in either of the different forms or modifications of my improved cupola or reverberatory furnaces.

The materials to be fused may also consist of iron or steel that has been obtained from pig or crude iron, and wholly or partially decarburized and purified by the action of nitrate of soda, or any analogous or other substances containing or capable of evolving oxygen on coming in contact with molten pig or crude iron, provided that the metal so obtained does not contain so large a quantity of phosphorus, sulphur, or other impurities as to render it unfit when fused for making into a marketable homogeneous malleable iron or cast-steel.

The materials which I employ in my improved furnaces or apparatus may also consist of any iron or steel in the form or condition of a metallic sponge or of any metallic iron obtained by the deoxidation of iron ore by cementation or otherwise, whether such sponge or metallic iron does or does not contain an admixture of earthy or other substances, or slags or substances which by fusion yield slags—such as the compounds of iron ore or oxides of iron and clay or other fusible matters, that are or may be made into bricks or lumps and cemented or otherwise so treated as to convert such ores or oxides of iron into metallic iron—provided that it be sufficiently free from carbon, sulphur, and phosphorus as to render it capable of producing, by fusion, a marketable quality of homogeneous malleable iron or cast-steel.

The materials which I employ may also consist of any wrought-iron or steel scrap—such as the crop-ends of iron or steel rails; also old or worn-out iron or steel rails, ingot ends, ladle-skulls, and scrap Bessemer iron and steel, or other refuse steel and iron known generally as "scrap," provided that such scrap or refuse metal does not contain so much phosphorus or other impurities as to render it unfit for the production of a marketable cast-steel or homogeneous malleable iron.

I would further state that in employing any of the aforesaid materials an addition may be made thereto when desired of some good pig or refined iron, or other carburet of iron or alloy of iron and manganese, either for the purpose of forming a bath in which the other metals to be fused are received, or for otherwise assisting their fusion, or of adding cheaply to the quantity of metal, or for the purpose of carburizing or of deoxidizing it to the desired extent. For this last purpose, however, spiegeleisen or ferro-manganese is greatly to be preferred. I would also remark that the addition of spiegeleisen or ferro-manganese, when employed for the purpose of altering the degree of carburation of the metal or for removing any oxgen therefrom, may be most advantageously used after the molten metal has run out of the furnace by putting it in a heated granular form, or as a fluid into the ladle which receives the charge of molten metal from the furnace.

I would further remark that the choice of the several kinds of metal before named for melting and obtaining cast-steel and homogeneous malleable iron will depend on their known quality or the local cost, and on the quality of the product desired to be obtained. The manufacturer will, for these several reasons, also employ them separately, or mixed in such proportions as he may think fit or as their nature and properties may render necessary or desirable.

I also desire it to be understood that furnaces constructed so as to have their temperature raised by the compression or condensation of the gaseous products of combustion within them, as herein described, may also be employed in fusing any of the more or less malleable kinds of iron and steel before enumerated and combining therewith pig-iron or other carburet of iron in such proportions as to form a sort of steely cast-iron or mixed metal suitable for casting railway-crossings and wheels, bells, anvil-blocks, stamp-heads, guns, mortars, projectiles, and other articles where a metal stronger and harder than ordinary cast-iron is required.

My improved furnaces may also be advantageously employed to melt any pig or other carburet of iron to be afterward converted into steel or malleable iron by the now well-known Bessemer process, and also in such cases where a carburet of iron difficult of fusion is employed, and also in all cases where the melted iron is required to be of a very high temperature.

I have hereinbefore described two modifications of the cupola-furnace, in both of which the metal to be fused and the fuel employed to fuse it are mixed and occupy one common chamber. I however desire it to be understood that my invention also consists in melting steel or malleable iron of any of the kinds or qualities hereinbefore enumerated when contained in fire-clay, plumbago, or other crucibles, and also in fusing the before-named metallic substances, or either of them, on the hearth of a reverberatory furnace arranged for working with the products of combustion under pressure, as in the cupola-furnaces hereinbefore described.

In constructing furnaces in which crucibles are to be used I prefer to make the fuel-chamber cylindrical and to supply it with blast in a similar manner to that already described in reference to the cupola-furnace. The upper part of the furnace is enlarged, and an annular seat or space is formed around the fuel-chamber, on which the crucibles are placed. The furnace is covered with a dome-shaped roof, and several small openings are left around the furnace for the escape of flame, suitable doors being formed in the dome or roof for the removal of the crucibles, the regulation of the pressure of the gaseous products and the feeding of the fuel being arranged in a manner similar to that already described in reference to the cupola-furnace; or the dome or top of the furnace may be made to turn round, and all the crucibles may in that case be lifted out through a single opening, which is brought in succession over each crucible.

I desire it to be understood that when crucibles are employed in my improved furnace both cast-steel and homogeneous malleable iron, and also any alloys of iron and manganese that have been or may be made in crucibles contained in ordinary furnaces, may in like manner be made in my improved furnaces, whether such cast-steel or homogeneous malleable iron, or alloys of iron with manganese or other metals be the result of simple fusion or be produced by the chemical action or reaction of any materials put into them for that purpose.

In order that the mode of constructing high-pressure crucible-furnaces employed for the fusion of malleable iron or steel or alloys of iron with other metals may be fully understood, I have represented two methods of effecting this object.

On Sheet D of the drawings hereunto annexed, where Fig. 1 is a vertical section of a crucible-furnace with a revolving crown or dome, the outer shell, a, of the furnace is made of stout iron or steel boiler-plate, securely riveted and calked at all laps and joints. The bottom is further strengthened by stout T angle-irons riveted across it. The lower part of the furnace-casing is sunk into the ground, as shown by the position of the floor-line b around the upper part of the shell a. The massive cast-iron ring c is secured by bolts. Through the angle-iron d a channel or air-passage, c*, is cored in the ring c, and its upper surface is truly faced in the lathe. A second cast-iron ring, e, is also employed, and forms a "skew-back," in which the arch or dome f is built. The ring e is strengthened by shrinking on it a band of wrought-iron or steel, g, and also by the webs e*. The lower side of the ring e is surfaced truly in the lathe, and has a small channel, n, formed in it. When the ring e rests on the ring c the channel n forms a close annular passage. A great many small holes, m, are drilled into the channel c*, so that when air from the main blast-pipe is allowed to flow into the channel c* it will pass through the numerous small holes m and occupy the channel n, so that in case of any imperfection of the fitting together of the rings e and c the air under pressure in the channel c* will find an escape between the rings, flowing chiefly outward, where there is only the external atmospheric pressure to oppose it; but the air supplied from the main blast-pipe to the channel c* being under a somewhat greater pressure than the confined gases within the furnace, a small portion of the compressed air will pass inward through such imperfect joint and effectually prevent the escape of any flame or heated gases, and thus prevent the injurious action that might otherwise result from such escape. The pipe which conveys air from the main blast-pipe into the channel c* is not shown in the drawings; but it may convey it into any part of that channel. This pipe should be provided with a sluice-valve, by means of which the quantity and pressure of air flowing into the channel c* may be so controlled that scarcely any air is allowed to flow into the furnace.

The dome or crown of the furnace is formed externally of strong riveted plates i, secured to the ring e by a wrought-iron angle-ring, j, and is lined with fire-brick f, or other refractory material, as hereinbefore described with reference to the cupola-furnaces. The lower part is also lined in a similar manner, as shown at l. That part of the furnace l* where the crucibles rest I however prefer to make of large fire-brick lumps, as they form a more solid bed for the pots than ganister or other similar lining.

At p p are shown the orifices of two fire-clay tuyeres, of which several may be used, and which are fitted into the furnace and to the outer shell, and are also connected to the blast-pipe in the same manner as the tuyeres shown in detail as applied to the cupola-furnaces, hereinbefore described. A similar arrangement is also made for clearing out the slags and residue of fuel, as shown in the cupola-furnace, Figs. 1 and 2, Sheet A, of the annexed drawings, small ash-pits being formed in the floor for gaining access to this cleaning-out hole and to the tuyeres. The ash-pits are covered with an iron plate or grating at the floor-level.

An opening is made in the dome at k*, through which the crucibles q are put in and removed by means of tongs, as usually practiced in steel-melting furnaces. The metal to be melted in them may also be supplied through this opening, and the pot-lids put on after charging, as usual in other crucible-furnaces. The crucibles are also placed on stands r, as usual. The fuel may be supplied, when necessary, through the opening k* by means of a funnel, s, (shown by dots,) which is temporarily introduced at the time of putting in the fuel, which I prefer to be of good hard coke.

A flange-ring of metal, t, is riveted to the crown-plates i. This ring is constructed in the same manner (except in so far as it fits eccentrically onto the dome) as the ring or hoop p, (shown at Figs. 1 and 3, Sheet A, of the annexed drawings.) The opening k* is intended to be closed by a furnace-door suspended from a train, r, moving laterally on a crane-post in suitable bearings attached to a shell of the furnace, in the manner hereinbefore shown and described in reference to Figs. 1 and 3, Sheet A; similar arrangements for the admission of air to the joint and the flow of cold water for keeping down the temperature of the ring t as is also made in the ring p, Sheet A.

In the center of the dome I provide an opening for the escape of the gaseous products of combustion, which opening is constructed as follows: A stout ring of iron, u, is riveted to the dome-plates, and to this ring is bolted the movable flange-ring v. A piece of well-burned fire-clay, w, is fitted into the conical interior of the ring v. The size of the opening in the piece of fire-brick u determines the quantity of gases allowed to escape under any given pressure. By unbolting the ring v different-sized outlet-pieces can be employed. A pipe, x, pendent from the roof of the building, and passing through i at its upper end, will convey away the flame and heated gases accompanied by a large quantity of the surrounding air taken up as an inducted current, thereby preventing the overheating of the pipe x.

In order to secure the dome of the furnace in place during the period when the furnace is working under pressure, ten or twelve stout wrought-iron brackets, A, are bolted securely to the ring c, and have strong steel capstan-headed screws B passing through the overhanging part of them. Before turning on the blast to the furnace all these screws must be brought to bear firmly on the upper side of the hoop, by which means the pressure within the furnace is unable to raise the dome from its seat. So soon, however, as the workman judges that the metal in his crucibles is in a state of complete fusion, he will shut off or moderate the blast for a short time, in order to cool down the pots, as usual, before "teaming." He will then slacken all the screws B, raise the furnace-door by means of the screw apparatus, and swing it round so as to afford easy access to the crucible immediately beneath the opening, which he will lift out with his tongs, as usual. By then turning on a little blast to the channel $c^x$ the pressure of it, acting on the lower surface of the ring e, will cause the dome to either entirely float off its seat, or by moderating the pressure he can relieve it of so much only of the weight pressing on the ring c as to allow it to be moved round with great freedom. Six or more small guide-rollers, D, are mounted on studs which project downward from the ring e. The rollers run in contact with the inner face of the ring c, and thus insure the proper position of the dome, on the upper side of which several snugs or staples, E, are riveted, into which a staff, F, can be inserted, for the purpose of turning round the dome of the furnace, and thus giving access to each crucible in succession. The crucibles may again be replaced when emptied, after which the furnace may be supplied with fresh fuel, the crucibles charged with metal, and the screws B tightened down, and the furnace-door again brought over the opening and secured there. The operation of the furnace may then be continued under such an amount of internal pressure as is found best adapted for the economical fusion of the particular quality of metal employed.

At Fig. 2, Sheet D, I have shown another modification of the high-pressure crucible-furnace, the outer shell, G, of which is constructed with riveted plates, and is lined throughout with fire-brick or other refractory material, H, the tuyeres and the mode by which they are secured and connected to the blast-pipe being the same as in the furnace last herein described. In lieu, however, of the movable dome for giving access to the several crucibles I, four or other convenient number of openings, J, are made in the dome or crown of the furnace, through which the crucibles may be placed and removed when required. A pair of tongs with the joint formed on one side of the claws will allow the workman to place through the opening one crucible to the right hand of the opening and the next one to the left, and finally he can place one centrally between the other two and directly beneath the opening, so that the four openings into the furnace will suffice for the placing of twelve crucibles, and also serve to introduce the fuel when required. A lump of molded fire-clay, K, having a ring inserted in it, is placed in the opening J, and above it is placed a strong iron plate, L, having its edge truly formed into a cone. A flanged ring, M, is riveted to the plates of the dome, and is made conical on its interior surface, to fit the plate L, around which a little luting may be put, as practiced in keeping the joints tight at the mouth of gas-retorts. Two strong staples, N, are riveted to the crown-plates. Through these staples the iron bar P is passed. A screw, O, passes through this bar, which is employed to bind the plate L firmly on its seat. The openings Q Q, for the escape of the products of combustion, may be placed on the sides of the furnace opposite to a flue or chimney-opening; or they may be fitted into the crown of the furnace, as hereinbefore described in reference to the crucible-furnace with a revolving dome, and which latter form of crucibles I prefer for the purposes of my invention.

In constructing furnaces in which the metal is to be fused on the hearth of the furnace, in the manner of reverberatory furnaces, the same general arrangement of fire-chamber and tuyeres may be used as that already described, the roof or arch of the furnace being a short distance only above the hearth, the escape of gaseous matters at the opposite end to the fire-chamber and the regulation of the pressure of the combined gaseous products, and also the feeding in of the materials and fuel, being arranged in a similar manner to that hereinbefore described in reference to the cupola-furnace.

The mode of constructing high-pressure reverberatory furnaces for the fusion of malleable iron and steel, or other carburets of iron, is represented in Sheet D of the annexed drawings, where Fig. 3 is a longitudinal vertical section on the line A B of Fig. 4, and Fig. 4 is a vertical cross-section on the line C D of Fig. 3, showing the fire-chamber in elevation, the feeding-door and its appendages being omitted in this view.

a is the outer shell of the furnace, formed of stout iron or steel, both plates well riveted together and calked air-tight at all laps and joints. The end plates, $a^x$, are further supported by stout angle gusset-plates $a'$. The fire-box end of the shell a is in the form of a vertical cylinder, and is strengthened at bottom by stout T-angles riveted across it at $a^2$. The upper part of the shell of the fire-box is strengthened by a massive hoop of iron, b, into which numerous screwed studs c are tapped, by means of which and the nuts fitted to them the dome or crown of the shell is held securely in its seat. This mode of fixing on the crown is adopted to facilitate the relining of the furnace from time to time.

The body of the furnace is oval in cross-section. The oval part at $a^3$ is riveted up to a corresponding opening in the cylindrical fire-box, and terminates at the angle-flange $d$, to which it is also riveted. The end piece, $a^4$, has a similar angle-flange, $e$, riveted to it. This part of the furnace is supported on a cast-iron standard, $f$, by which it is retained in position when the central part, $a^5$, is taken away on a truck for the purpose of being relined. There are also angle-flanges, $g$ and $h$, riveted to the central part, $a^5$, all of which flanges, $d$, $e$, $g$, and $h$, are truly faced in the lathe, so as to be firmly bolted together and form a close air-tight junction of the different parts of the furnace, capable of resisting the great internal pressure of the gaseous matters confined within the furnace, and at the same time admitting the central part of the outer shell being removed, and thus affords facility for relining the furnace when required, and which lining may be readily effected by inserting a properly-shaped wooden pattern into the part to be lined and ramming in the moistened ganister around it.

The orifices of the tuyeres are shown at $i$. They are formed of fire-clay or plumbago, and are secured air-tight to the outer shell of the furnace, and connected to the tuyere-pipes in the same manner as hereinbefore described and shown with reference to the tuyeres and pipes employed in the cupola-furnace represented on Sheet A of the annexed drawings.

An opening for running out slag from the fire-chamber $j$ is shown at $k$. It may be stopped with loam, as usual in cupola-furnaces, and be secured by a covering-plate, $l$, securely bolted on to prevent the loam from being blown out.

A slightly-conical aperture, $m$, leads from the fire-chamber to the crown of the furnace, where the door for feeding the fuel is situated.

A flanged ring of metal, $n$, is riveted to the crown of the furnace, having a passage, $s$, for the circulation of water formed in it, and also pipes $r$ $r$, to convey water to and away from it.

Figure 6:
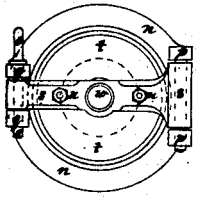

This arrangement and the construction of the large circular door $q$ are precisely the same as hereinbefore shown in detail, as applied to the cupola-furnace represented in Sheet A of the annexed drawings; but instead of applying the screw and worm-wheel arrangement for opening the door and tightening it down, as before described, I employ the pressure of the blast or the pressure of steam or water to act on a piston, and thus exert the force necessary to keep the furnace closed. This method is shown in elevation as attached to the reverberatory furnace on Sheet D, and is also shown at Fig. 6 on Sheet C of the annexed drawings, partly in section, and in plan at Fig. 7 on the same sheet.

The same letters of reference are used where the parts are repeated in these figures.

$t$ is the crane-post, with a tubular passage, $t^*$, formed in it.

$u$ is the foot-step in which the crane-post moves. The foot-step $u$ is bolted to the shell of the furnace. A small pipe, $v$, conveys air under pressure into it, and from which it is prevented from escaping by a stuffing-box and gland. The air can, however, pass upward through the small passage $t^*$.

The upper part of the crane-post is supported in a bracket-piece, $w$, which is riveted, by a flange, $w^*$, to the shell of the furnace, and is formed into a shallow open cylinder, $t'$. Two arms, $x$, forming part of the crane-post casting, also project upward and carry between them the beam $y$, which is supported on a pin-joint, Z. At $y'$ another pin-joint is formed, and by means of the links D the beam is attached to the piston E, which is made air-tight by packing-rings, in the usual manner. The opposite end of the beam $y$ is jointed to the upper side of furnace door by the joint-piece G and pin I.

In the lower part of the metal of the cylinder a small cock, J, is provided, having a very small way through it, to prevent the too-sudden passage of air or other fluid into the cylinder. A small hole is drilled horizontally through the metal forming the lower part of the cylinder, and at right angles to the axis of the cock J, so that the cock may act two ways—that is, it may discharge air from beneath the piston when turned into the position shown in Fig. 6 by the horizontal passage before referred to, and by reversing it the air passing up through the crane-post will be conveyed beneath the piston, and by means of the pressure so exerted the piston will rise and the beam or lever $y$ will force the furnace-door firmly onto its seat. By this arrangement the opening and closing of the furnace-door may be rapidly effected with the labor only of turning the small stop-cock J.

The piston requires to travel only about one inch in order to lift the door sufficiently high to admit of its being moved on one side. The feeding-cylinder will thus be brought over the opening $m$ and discharge its fuel into the furnace. The feeding-cylinder is, however, omitted in Figs. 3 and 4, Sheet D, and in Figs. 6 and 7, Sheet C; but it is made and attached to the crane-arm in the manner shown in Figs. 1 and 2, Sheet A.

I would also remark that although I have shown the arrangement for closing the furnace-door in the reverberatory furnace and the screw and worm-wheel arrangement as applied to the cupola-furnace, it will be obvious that either mode may be employed in both kinds of furnace.

The exit-passage for the gaseous products of combustion (shown at M) is molded in fire-clay and well burned. A joint is formed between it and the ring N with rust-cement, with which the joint is calked. The ring N is securely riveted to the end furnace-plate, and to it is bolted the flanged collar P, by means of which movable rings of fire-brick Q, or other refractory material, are retained in their position, and from which they may, when necessary, be removed or exchanged for other rings having a different area of outlet.

In addition to or in substitution of this mode of regulating the escape of the gaseous products of combustion from high-pressure furnaces, I sometimes employ a valve formed of well-burned fire-brick or other refractory non-metallic substance. A valve so constructed is shown at Fig. 8 on Sheet C, where *a* represents the upper portion of any furnace to which it may be applied. *b* is a beveled flanged ring riveted to the shell of the furnace. *c* is a hollow cone of fire-brick, the large end of which is capable of passing through the small part of the ring *b*, the space being afterward filled with rust-cement. *d* is part of an iron bar fixed to any convenient part of the apparatus, and serving as a guide through which the rod *e* slides freely up and down. The lower end of the rod is screwed into an iron box or frame, *f*, beveled on the inside, for the purpose of receiving the fire-clay valve *g*, which is held in the box by cement run in between it and the beveled sides of the box. A weight, *i*, is placed on the top of the rod to regulate the pressure, and a nut and collar at *h* will prevent the fire-clay surfaces from at any time coming in contact and adhering together. Although this valve will not prevent the escape of some heated gases, it will, nevertheless, prevent the pressure from rising above the limit assigned.

The reverberatory furnace is provided with a tap-hole, (shown by dots at M*.) This hole may be stopped with a fire-clay cone, as shown at Figs. 1 and 2 on Sheet A, as applied to the cupola-furnace.

I prefer to employ two doors for charging in the metal to be melted. One may be placed on each side of the furnace, or they may be both on one side of it, as shown at *m m*, Fig. 3, Sheet D. Fig. 5 on this sheet also shows a horizontal section of one of these doors, and Fig. 6 a front elevation of the same.

A strong iron frame, *n*, is riveted by its flange to the shell of the furnace. The outer face of this frame is faced and has a deep groove, *r*, formed in it, into which air from the main blast-pipe may be supplied by a small pipe having a stop-cock upon it. There are projecting lugs, *p*, formed on the ring *n*, which form a hinge-joint, and at the opposite side of the ring are similar lugs, *q*, through which the movable pin O is placed. An arm or jointed lever, S, is fitted at one end in between the lugs *p*, and thus forms a hinge-joint, on which the door may be moved when the pin O is withdrawn.

The door consists of a circular iron box, *t*, into which a fire-brick, *m*, is fitted. The box *t* has two studs, *u*, projecting from it, which pass freely through the arm S, for the purpose of supporting the door when it is thrown back on the hinge-joint. A powerful steel capstan-headed screw, *w*, passes through the lever S, by means of which the door is forced tightly against the grooved face of the frame *n*, after which air is allowed to flow into the groove or channel *r* under sufficient pressure to prevent the escape of the flame or heated gases of the furnace.

When employing such furnaces for the fusion of malleable iron and steel, or other carburets of iron, I charge on the materials by the doors last described, allowing a small part of them to occupy the hearth or bed of the furnace, and the remainder I dispose on the "bank" or higher part of the bed in such way as to intercept the flow of flame toward the outlet.

The malleable metal may be fused alone, or some good gray hematite or other pig-iron nearly free from sulphur and phosphorus may be employed; or, in lieu thereof, some iron known as "spiegeleisen" may be put into the hearth of the furnace and form a bath to collect the other fused materials in; or the malleable part of the charge may, when thoroughly heated, be pushed forward into the bath of molten carburet of iron; but when steel, wrought-iron, or malleable iron of any kind, or when iron sponge or iron bricks, are to be fused in such furnaces in the absence of any pig-iron, I use a higher pressure than when pig-iron is used in admixture with them, in which case the pressure of the confined gases may range conveniently from thirty to fifty pounds pressure per square inch, and after tapping such molten malleable metal from the furnace into a casting-ladle provided with a valve and stopper, as generally employed in the Bessemer process, I add molten or hot granulated spiegeleisen or ferro-manganese thereto, in order to deprive the fluid metal of any oxygen it may have taken up and to carburize it to the extent desired. The fuel I prefer to use in the high-pressure reverberatory furnace is a good hard coke, and in order to produce a powerful flame I employ along with the coke a liquid hydrocarbon. The creosote, petroleum, or other hydrocarbon may be supplied to the blast-pipe by means of the apparatus shown at Fig. 5 on Sheet C of the annexed drawings. I however desire it to be understood that other fuel—such as anthracite or ordinary coal and dried wood or charcoal—may be employed, as found desirable.

Having thus described my invention and the manner in which the same has been and may be carried into practical operation, I desire it to be understood that I do not limit my claims to the precise details and modes herein described of carrying the same into effect, provided that the general and distinctive character of the said invention and the several parts thereof be retained; and in order that the extent and limits of my said invention may be more clearly ascertained, I desire to state that since the filing of the provisional specification of my present invention I have been made aware that it has been proposed by others to force air into the ash-pits of steam-engine boilers and other furnaces in which the air so to be forced was, in its escape from the furnace, proposed to be passed through a vessel of water and through a valve. It has also been proposed to trap the chimneys of steam-boilers and other furnaces, and thus prevent the free escape of the products of combustion, with the idea of thereby saving fuel. It has also been proposed to cause the complete combustion of gases in furnaces employed to melt pig-iron for heavy castings by supplying air to the ash-pit and in jets above the fuel by means of a blower or damper being used in the chimney to prevent the too-free escape of the gases, and causing the air to commingle more thoroughly with the combustible gases: but I am not aware that any proposal prior to the date of my present invention has ever been made to so construct furnaces as to enable them to withstand any considerable internal pressure, nor that any proposal has been made to fuse malleable or wrought iron and steel in furnaces where the products of combustion are kept under high pressure, and the temperature of the furnace thereby raised to the melting-point of those refractory metals. I have stated that I am aware of the proposals made prior to the date of my patent and above referred to in order that it may be clearly understood that I lay no claim thereto; but What I do claim as new and of my own invention is as follows:

1. The melting or fusing of malleable or wrought iron and steel, or other similar carburets of iron difficult of fusion, in a furnace constructed so as to be capable of sustaining a high internal pressure, by compressing the gaseous products of combustion within the said furnace which contains the said iron or steel to such a high pressure as will raise the temperature of the said furnace sufficiently high to fuse or liquefy the malleable or wrought iron or steel, or other similar carburet of iron difficult of fusion, which is contained therein.

2. The melting or fusing of malleable or wrought iron and steel, or other similar carburets of iron difficult of fusion, in furnaces supplied with a blast or current of compressed air, and in which furnaces the gaseous products of combustion are, by reason of the smallness of the escape aperture or apertures, prevented from escaping from the furnace until the pressure of such gaseous products contained in every part of the said furnace is substantially in excess of one pound per square inch above the external atmospheric pressure.

3. Determining the pressure of, and the rate of discharge of, the gaseous products of combustion from furnaces employed for the fusion of malleable or wrought iron and steel, and other similar carburets of iron difficult of fusion, when working with the gaseous products of combustion under high pressure, by employing simple contracted escape-openings in lieu of valves or traps.

4. The construction and employment of cupola-furnaces for fusing malleable or wrought iron and steel, or other similar carburets of iron difficult of fusion, such furnaces having a domed or covered top with a door, (for the admission of fuel and metal,) which door is faced with fire-brick or other refractory material, and is provided with a close external metal fitting, for preventing the escape of the gaseous products of combustion confined under pressure within the furnace.

5. The mode of opening or shutting the feeding-door of furnaces for melting malleable iron and steel, or other similar carburets of iron difficult of fusion, and confining the gaseous products therein by means of a compound screw apparatus, constructed and applied in the manner herein described.

6. The arrangements for regulating or altering the pressure of the gaseous products of combustion in furnaces employed for the fusion of malleable or wrought iron and steel, or other similar carburet of iron difficult of fusion, by means of movable escape-apertures of different areas of outlet, and also by diminishing or increasing the outlet by the insertion or removal from the escape-aperture of pieces of fire-clay or other refractory material, as herein described.

7. Mounting on axes through which air and water may be passed the cupola-furnaces employed in the fusion of malleable or wrought iron and steel, and other similar carburets of iron difficult of fusion, when such fusion is effected by the accumulated heat resulting from the retention of the gaseous products of combustion under high pressure within the said furnace.

8. The arrangement for preventing the escape of flame and heated products of combustion through the joints of feeding or other doors of furnaces employed under pressure, as described, for the fusion of malleable or wrought iron and steel, and similar carburets of iron difficult of fusion, by means of currents of air or steam supplied to the joint at a greater pressure than that of the confined gaseous products within the furnace.

9. Cooling the metal fitting or parts adjacent to the feeding or other doors or openings of furnaces employed under the pressure of the gaseous products of combustion, as herein described, to fuse malleable or wrought iron and steel, or other similar carburets of iron difficult of fusion, by suitable channels formed in the parts to be cooled, through which a stream of water is passed.

10. Closing or securing the feeding or other doors of furnaces employed under pressure of the gaseous products of combustion for the fusion of malleable or wrought iron and steel, or other similar carburets of iron difficult of fusion, by means of air, steam, water, or other fluid-pressure acting on a piston or plunger, in connection with such feeding or other doors.

11. The regulation of the pressure of gaseous matters contained in furnaces employed in the fusion of malleable or wrought iron and steel, or other similar carburet of iron difficult of fusion, by means of a loaded valve faced with fire brick or other analogous refractory material.

12. The fusion of malleable or wrought iron and steel, or other similar carburets of iron difficult of fusion, by the combustion of carbonic-oxide, carbureted-hydrogen, or other combustible gases with atmospheric air, such gas or gases and atmospheric air being forced into and ignited in furnaces the escape-aperture of which is so small as to cause the products of combustion to accumulate to high pressure within the furnace, so as to effect the fusion of said iron or steel.

13. The fusion of malleable or wrought iron and steel, or other carburets of iron difficult of fusion, by the combustion of liquid hydrocarbons in high-pressure furnaces, the fusion being effected under the accumulated heat arising from the compression and retention of the gaseous products of combustion under pressure within the furnace in which the said iron or steel is fused.

14. Coating the surfaces of pieces of malleable or wrought iron and steel, or other similar carburets of iron difficult of fusion, with clay, lime, silica, or mixtures thereof, or other materials capable of fusing into a glassy or vitreous covering, and thus protecting their surfaces from oxidation or carburation, and the fusion of such coated pieces in cupola or other furnaces where the gaseous products of combustion are retained under pressure, as herein described.

15. The fusion, in crucibles, of malleable or wrought iron and steel, or other carburets of iron or alloys of iron, with other metals, and the fusion of materials which yield malleable iron or steel when melted, such crucibles being heated in chambers or furnaces in which the gaseous products of combustion are retained under high pressure, as herein described.

16. The fusion of malleable or wrought iron and steel, or other similar carburets of iron difficult of fusion, in reverberatory furnaces in which the gaseous products of combustion are retained under high pressure, so that an accumulated heat is thereby obtained capable of fusing the said iron and steel.

17. In the construction of reverberatory furnaces employed for the fusion of malleable or wrought iron and steel, or other similar carburets of iron difficult of fusion, closely enveloping the brick-work or other equivalent refractory lining of such furnaces with a casing or jacket of riveted iron or steel plates calked at the joints, or made of cast-iron bolted securely together, such casing being sufficiently strong and tight at all points to withstand great internal pressure.

18. The fusion or remelting and heating of pig or crude iron in high-pressure furnaces in which the gaseous products of combustion are confined under high pressure, as described, and the conversion of such metal so melted and highly heated into malleable iron or steel by blowing air through such metal according to the Bessemer process, as is well understood.

19. Lining high-pressure furnaces employed for the fusion of malleable or wrought iron and steel, or other carburets of iron, under the pressure of the gaseous products of combustion contained therein, as described, by ramming or pressing plumbago moistened with water and fire-clay into the cavity or space to be lined.

20. The construction of high-pressure furnaces employed in the fusion of malleable or wrought iron and steel, or other carburets of iron, under pressure of the gaseous products of combustion, as herein described, with tuyeres or pipes made of fire-clay or of plumbago, for the conveyance of a blast of air into such furnaces.

21. In the construction of reverberatory gas-regenerative furnace, or other furnaces employing gaseous fuel, the closely enveloping of the fire-brick or other refractory lining of such furnaces with a shell of plate-iron or steel riveted, calked, and rendered tight at all laps and joints, or, when such shell is made of cast-iron, well bolted together and rendered tight at all joints, such iron, steel, or cast-iron shells being sufficiently strong and tight to withstand safely a great internal pressure.

22. The general arrangement of the furnaces and apparatus for the fusion or melting of iron and steel, substantially as herein described.

HENRY BESSEMER.

Witnesses:
DAVD. CONGDON,
*Forest Hill, London.*
G. F. WARREN,
*No. 17 Gracechurch Street, London.*